United States Patent
Tamaro et al.

(10) Patent No.: US 9,340,344 B2
(45) Date of Patent: May 17, 2016

(54) CONTAINER FOR FOODSTUFFS, IN PARTICULAR COFFEE, METHOD FOR ITS PRODUCTION AND METHOD FOR PACKING A FOODSTUFF

(71) Applicant: ILLYCAFFE' SPA CON UNICO SOCIO, Trieste (IT)

(72) Inventors: Walter Tamaro, Trieste (IT); Giulio Gerbino, Trieste (IT)

(73) Assignee: ILLYCAFFE' SPA CON UNICO SOCIO, Trieste (IT)

( * ) Notice: Subject to any disclaimer, the term of this patent is extended or adjusted under 35 U.S.C. 154(b) by 0 days.

(21) Appl. No.: 14/400,285

(22) PCT Filed: May 10, 2013

(86) PCT No.: PCT/IB2013/000896
§ 371 (c)(1),
(2) Date: Nov. 10, 2014

(87) PCT Pub. No.: WO2013/167958
PCT Pub. Date: Nov. 14, 2013

(65) Prior Publication Data
US 2015/0136780 A1   May 21, 2015

(30) Foreign Application Priority Data
May 11, 2012   (IT) .............................. UD2012A0085

(51) Int. Cl.
*B65D 81/20*   (2006.01)
*B65D 21/02*   (2006.01)
(Continued)

(52) U.S. Cl.
CPC ............ *B65D 81/2015* (2013.01); *B29C 65/08* (2013.01); *B29C 65/1403* (2013.01);
(Continued)

(58) Field of Classification Search
CPC ........... B65D 81/2015; B65D 81/2007; B65D 81/20; B65D 11/02; B65D 11/26; B65D 17/502; B65D 3/12; B65D 21/0219; B65D 77/2024; B65D 81/2084; B65B 1/02; B65B 31/00; B65B 31/006; B29C 65/08; B29C 65/1403; B29D 22/003
USPC .............. 220/613, 612, 610, 678, 677, 359.4, 220/359.1, 675, 669; 215/232; 53/478, 477, 53/476, 471
See application file for complete search history.

(56) References Cited

U.S. PATENT DOCUMENTS 2,797,023 A * 6/1957 Kaercher ................. B01J 47/02
220/610
3,518,136 A * 6/1970 Ide Masao .............. B29C 65/08
156/580.2

(Continued)

FOREIGN PATENT DOCUMENTS

| CH | 339 077 A | 6/1959 |
|---|---|---|
| EP | 0 267 443 A2 | 5/1988 |

(Continued)

OTHER PUBLICATIONS

Search Report for PCT/IB2013/000896, mailed Sep. 3, 2013.
(Continued)

*Primary Examiner* — Robert J Hicks
(74) *Attorney, Agent, or Firm* — Marshall, Gerstein & Borun LLP

(57) ABSTRACT

A container for foodstuffs includes a central body made of flexible material, a bottom associated to a lower end of the central body, and a lid attached to an upper end of the central body by an upper ring made of rigid plastic material. The container also comprises a lower ring also made of rigid plastic material, which makes the bottom solid with the central body.

13 Claims, 7 Drawing Sheets

(51) Int. Cl.
  B65D 77/20 (2006.01)
  B65D 3/12 (2006.01)
  B29C 65/08 (2006.01)
  B29C 65/14 (2006.01)
  B29D 22/00 (2006.01)
  B65B 1/02 (2006.01)
  B65D 8/00 (2006.01)
  B65D 17/50 (2006.01)
  B65D 6/34 (2006.01)
  B65B 31/00 (2006.01)

(52) U.S. Cl.
  CPC ............ B29D22/003 (2013.01); B65B 1/02 (2013.01); B65D 3/12 (2013.01); B65D 11/02 (2013.01); B65D 11/26 (2013.01); B65D 17/502 (2013.01); B65D 21/0219 (2013.01); B65D 77/2024 (2013.01); B65B 31/00 (2013.01); B65B 31/006 (2013.01); B65D 81/2084 (2013.01); B65D 2543/0037 (2013.01); B65D 2543/00092 (2013.01); B65D 2543/00296 (2013.01); B65D 2543/00333 (2013.01); B65D 2543/00425 (2013.01); B65D 2543/00435 (2013.01); B65D 2543/00509 (2013.01); B65D 2543/00564 (2013.01)

(56) References Cited

U.S. PATENT DOCUMENTS

| | | |
|---|---|---|
| 4,529,100 A | 7/1985 | Ingemann |
| 5,692,635 A | 12/1997 | Farrell et al. |
| 2004/0031798 A1 | 2/2004 | Fox et al. |
| 2008/0105698 A1 | 5/2008 | Paradiso |
| 2012/0234835 A1* | 9/2012 | Minnette ............ B65D 17/12 220/359.2 |

FOREIGN PATENT DOCUMENTS

| | | |
|---|---|---|
| EP | 1 882 637 A1 | 1/2008 |
| GB | 446 323 A | 4/1936 |

OTHER PUBLICATIONS

Written Opinion for PCT/IB2013/000896, mailed Sep. 3, 2013.

* cited by examiner

CONTAINER FOR FOODSTUFFS, IN PARTICULAR COFFEE, METHOD FOR ITS PRODUCTION AND METHOD FOR PACKING A FOODSTUFF

FIELD OF THE INVENTION

The present invention concerns a container made of flexible material, for example cylindrical in shape and of relatively limited sizes, that is, with a volume of up to 1000 cm$^3$, provided with a hermetic lid and suitable to contain foodstuffs, in particular coffee, in granules or powder form. The container according to the present invention can be used both as an autonomous container in the home, and also as a refill for another container, for example more rigid. During the method for packaging the foodstuff into the container, the inner volume of the latter is filled with inert, pressurized gas.

BACKGROUND OF THE INVENTION

In the field of containers for foodstuffs, and in particular for coffee, non-pressurized (where the internal pressure is equal to atmospheric pressure) or de-pressurized (where the internal pressure is less than atmospheric pressure) cylindrical containers are known. They comprise a cylindrical shell or central body, made of multi-joined flexible material, which is attached by means of welding at the lower part to a disc-shaped bottom, also made of multi-joined flexible material, and at the upper part to a lid made of peelable plastic material, welded onto an upper ring made of rigid plastic material, which in turn is welded on the shell. The bottom of the container is sometimes provided with a venting valve, normally of the mono-directional type, to allow air to escape to the outside.

These known containers are used in the home to contain foodstuffs, both liquid and solid, such as for example coffee, in beans, in powder or in pods. In this case, to guarantee the correct conditions for preserving the coffee, multi-joined flexible materials of a known type are usually used, with 3 or 4 layers, and inert and non-toxic gas is introduced inside the container. In this way, however, the package in its entirety keeps the characteristics of the foodstuff substantially unaltered (the so-called "shelf life") for a maximum of 12 months, and with an internal oxygen residue of 3%.

In the state of the art, in order to create a barrier against the oxygen, the following components are usually used:
  for the central body: multi-joined flexible material consisting of the following 4 layers: OPP 30-40µ; PET 12µ; Alu 8µ; PP 70-90µ;
  for the bottom: multi-joined flexible material consisting of the following 3 layers: PETP 12µ; Alu 8µ; PP 200µ;
  for the lid: semi-rigid material consisting of the following 3 layers: PP 250µ; EVOH 18µ; PP 250;
  for the upper ring: PP.

In the state of the art the different components of the container are welded to each other as follows:
  the longitudinal edges of the central body: heat welding;
  the bottom to the central body: ultrasound welding;
  the lid to the upper ring: ultrasound welding;
  the pre-assembled whole consisting of the lid and the upper ring on the central body: heat welding;
  the valve to the bottom: gluing.

Furthermore, in the state of the art, the following plastic components are made using the following techniques:
  the lid: thermoform molding;
  upper ring: injection molding.

One disadvantage of these known containers is that the rigid upper ring is usually made of materials like PP, without an oxygen barrier, so that, since it has parts exposed to the air, it becomes a preferential channel for the entry of atmospheric oxygen inside the container itself, with a consequent deterioration of the foodstuff contained inside, for example the coffee may go rancid.

Another disadvantage of these known containers is the pressure generated inside the container by the foodstuff itself, in particular coffee, combined with that of the inert gas, even if it does not prejudice the airtight seal of known weldings (of the heat and ultrasound type), but only if it remains below 150 mbar. Furthermore, as a result of the internal depression, following high-altitude transport, the known container can implode, prejudicing the cylindrical shape and the aesthetic result.

Another disadvantage of these known containers is that the valve, if present, located on the bottom of the container, by venting the pressure inside the container, also causes the aromas inside to come out, and does not guarantee a residual internal pressure so that the aromatic components can be optimally attached inside the granules of coffee powder.

US 2008/105698 describes a container for foodstuffs, in particular coffee, with a central body made of flexible material, a bottom and a lid, where the lid is associated with the upper end of the central body by means of an upper ring made of rigid plastic material.

One purpose of the present invention is to obtain a container for foodstuffs, in particular but not exclusively coffee, for example of the cylindrical type, which is flexible, pressurized, hermetically sealed, which not only overcomes the disadvantages of the state of the art but is also safe, reliable and inexpensive, so as to guarantee optimum preservation, possible aging or maturing and a qualitative improvement of the foodstuff, for example coffee, contained therein, and which also guarantees to maintain its entirety and integrity for a long period of time, more than 12 months.

Another purpose of the present invention is to obtain a container that can be used both as an autonomous receptacle for containing foodstuffs, and also as a refill for another container for foodstuffs, for example stronger, like the known cans made of tin.

Another purpose of the present invention is to perfect a method for the production of a container for foodstuffs, in particular but not exclusively coffee, using non-toxic, plastic and metal multi-joined materials, which is economical, simple and reliable.

Another purpose of the present invention is to perfect a method for packaging a foodstuff, in particular but not exclusively coffee, inside said container, which guarantees optimum preservation conditions of the product and also an optimum airtight seal, with a barrier against the entry of oxygen from the outside, less than 1.5%, so as to achieve a shelf life of more than 12 months.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a container for foodstuffs according to the present invention comprises a shell, or central body, a bottom attached to a lower edge of the central body, and a lid attached to an upper end of the central body by means of an upper ring made of rigid plastic material.

According to one characteristic of the present invention, the container also comprises a lower ring, also made of rigid plastic material, which makes the bottom solid with the central body.

In particular, the bottom comprises a film made of multi-joined material, pre-shaped and welded onto the lower ring.

Advantageously, in one form of embodiment, the film made of multi-joined material is welded peripherally to the lower ring and inside the central body, in an intermediate position between the central body and the lower ring, thus improving the sealing characteristics of the seal.

According to another form of embodiment, the lid is also welded peripherally to the rigid upper ring and inside the central body, in an intermediate position between the central body and the upper ring.

According to another characteristic of the present invention, the method to produce a container for foodstuffs, in particular coffee, comprises a first step in which a central body is made of a multi-joined flexible material, a second step in which a bottom is made, also of a multi-joined flexible material, to be associated with a lower end of the central body, and a third step in which a lid is made, to be attached to an upper end of the central body, by means of an upper ring made of rigid plastic material. Advantageously, during a subsequent fourth step, the bottom is attached to a lower ring made of rigid material.

Furthermore, according to another characteristic feature of the present invention, during the first step the longitudinal edges of the central body are attached by means of induction welding, during the fourth step the bottom is attached to the lower ring by means of heat welding, or induction welding, during a fifth step the pre-assembled whole consisting of the bottom and the lower ring is attached to the central body by means of induction welding, during a sixth step the lid is attached on the upper ring by means of ultrasound welding, and during a seventh step the pre-assembled whole consisting of the lid and the upper ring is attached on the central body by means of induction welding.

According to another characteristic of the present invention, the method for packaging a foodstuff, in particular coffee, comprises a step of creating a vacuum inside the container, after filling it with the foodstuff, a subsequent step of introducing inert gas, so as to take the inside of the container to super-pressure, to a level slightly above atmospheric pressure, and a subsequent step of closing the container in order to maintain said super-pressure inside it.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF SOME PREFERENTIAL FORMS OF EMBODIMENT

Figure 1:
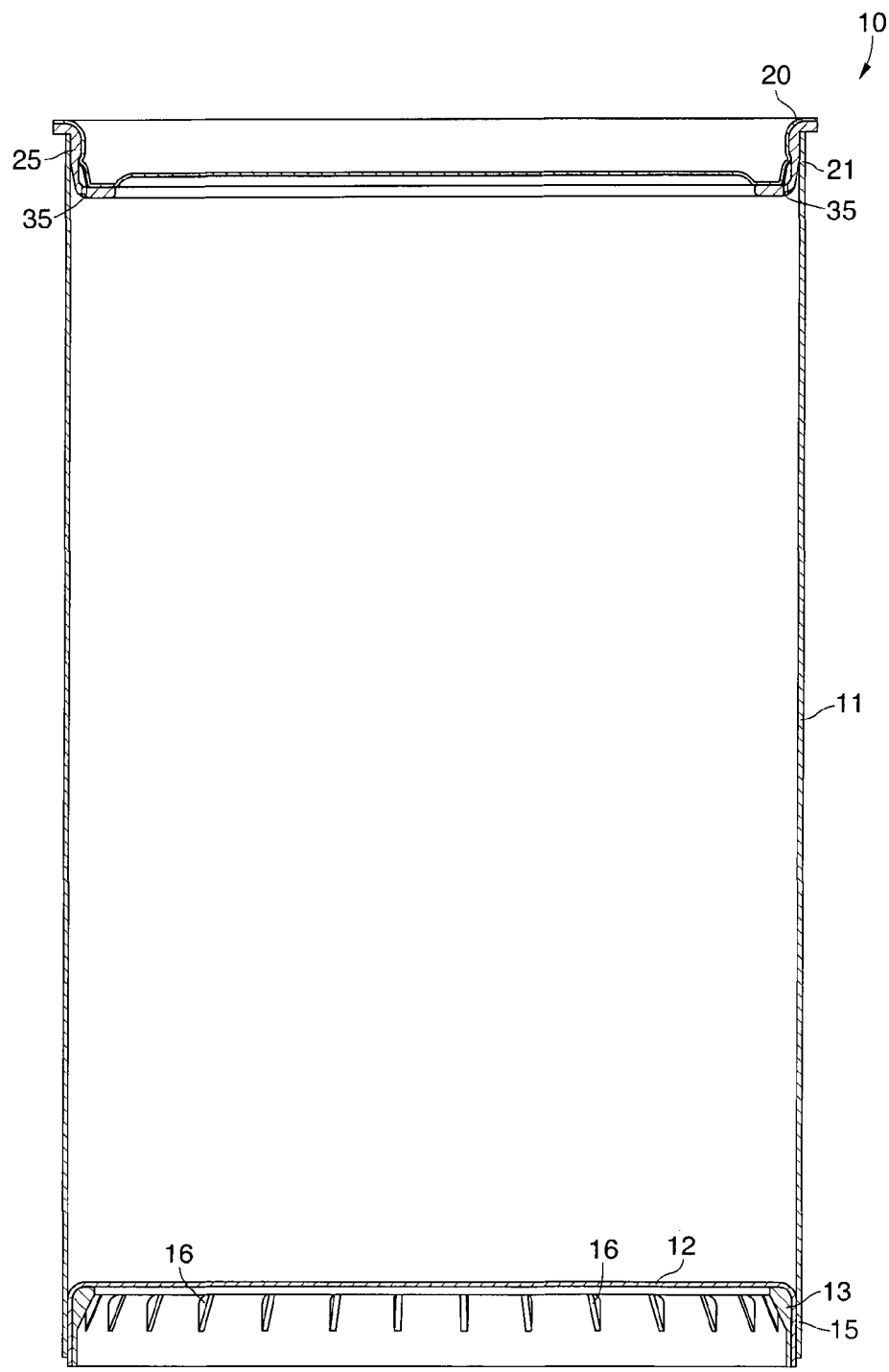
FIG. 1 is a longitudinal section of a container according to the present invention.

With reference to FIG. 1, a container 10 according to the present invention comprises a central body 11, also called shell, substantially cylindrical in shape and hollow inside, made of multi-joined flexible material of a known type and with 4 layers, consisting for example of OPP 30μ, printing, PET 12μ, Alu 8μ and PP 90μ. The sizes of the central body are such as to define an inner volume preferably comprised between 100 and 1000 cm³, for example 250 cm³.

A bottom 12, substantially disc-shaped and made of multi-joined flexible material in 4 layers, for example the same as or similar to that of the central body 11, is attached to the lower end 15 of the central body 11 by means of a lower ring 13 made of rigid plastic material, for example PP.

Figure 6:
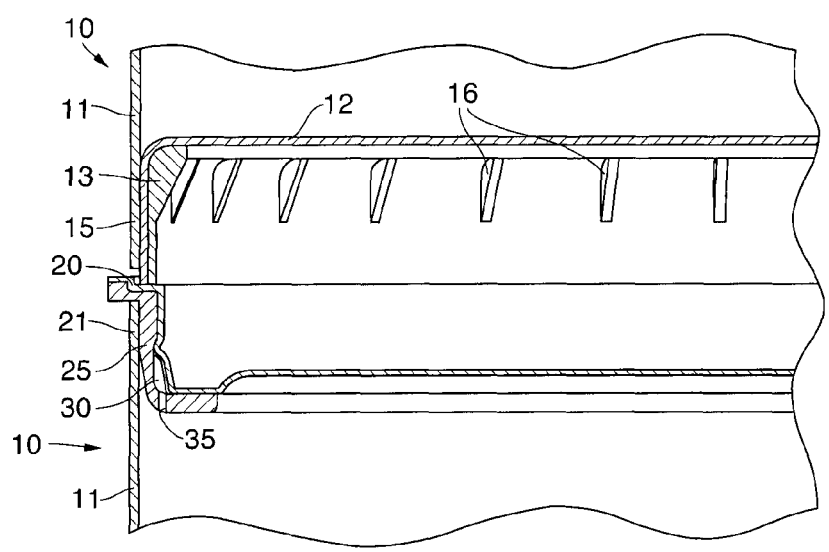
FIG. 6 is a schematization of two containers according to the present invention, stacked on top of each other.

The lower ring 13 (FIGS. 1, 6 and 9) is provided with a plurality of stiffening ribs 16 disposed radially or circumferentially. The bottom 12 is attached to the ring 13, for example by welding, so as to cover it entirely (overlapping) and to be disposed peripherally, in a sandwich, between the latter and the central body 11 to which it is attached by welding, so that it is the bottom 12 itself that acts as a barrier against the oxygen.

In this way, the lower ring 13 itself does not necessarily have to achieve the barrier against the oxygen since, during the welding to the central body 11, it is adequately covered by the flexible material that makes up the bottom 12, and in this way unprotected areas, exposed to the atmosphere and in contact with the product (e.g. coffee), are avoided.

It should be noted that one of the characteristics of the container 10 is precisely an optimization of the hermetic seal and an improved rigidity, obtained by welding the bottom 12 on the lower ring 13 and inside the central body 11 and not, as usually happens in the state of the art, outside it.

Figure 3:
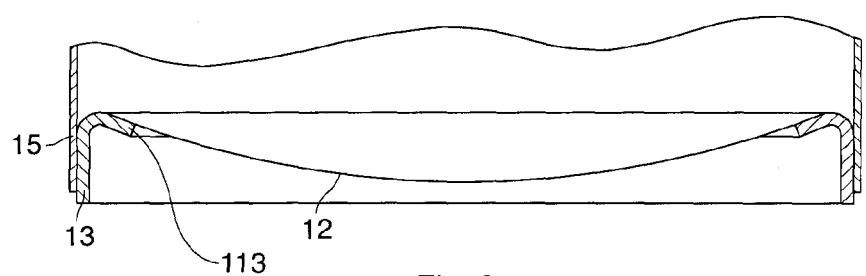
FIG. 3 is a second enlarged part of the container in FIG. 1.
Figure 9:
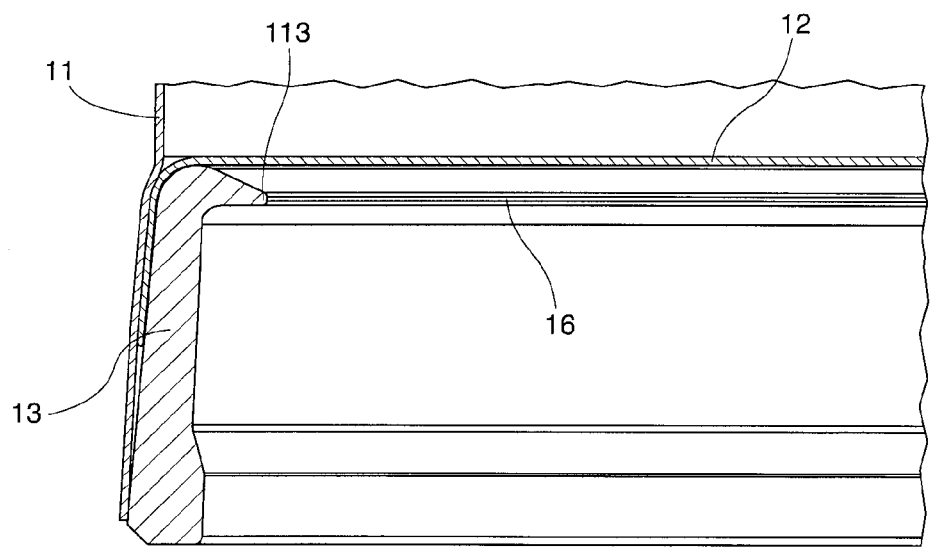
FIG. 9 is another variant of the second part in FIG. 3.

According to a variant, shown in FIG. 3 and FIG. 9, the lower ring 13 has its internal edges 113, on which the bottom 12 is attached, partly bent downward, so as to follow the natural phenomenon of bulging of the flexible material of the bottom 12, welded inside the central body 11, and at the same time so as to prevent the bottom 12 from becoming detached, thus reducing the stresses to which it is subjected.

Figure 4:
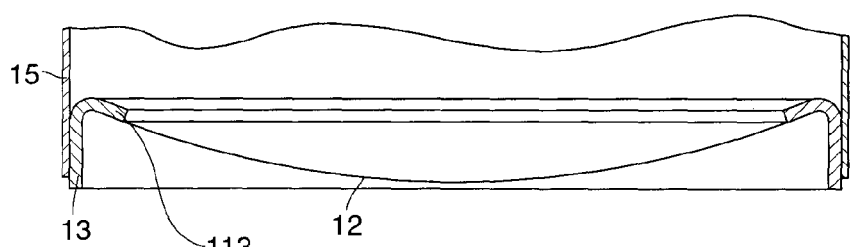
FIG. 4 is a variant of the second part in FIG. 3.

According to another variant, shown in FIG. 4, the bottom 12 is attached to the lower part of the ring 13.

Figure 2:
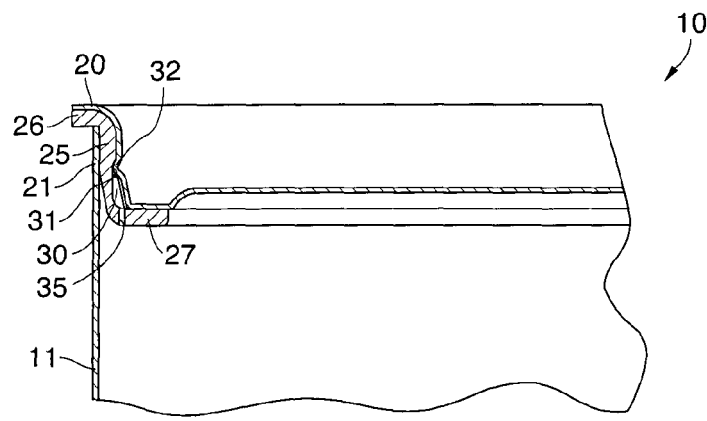
FIG. 2 is a first enlarged part of the container in FIG. 1.

A lid 20 (FIGS. 1, 2 and 8) made of 3-layer semi-rigid material, consisting of PP, EVOH and PP, with a total thickness of about 500μ, of which about 1.5% of EVOH (=7.5μ) (increasable to 15μ and more), on which a peelable film is glued, that is, which can be torn off, made of PE and with a thickness of 50μ is attached to the upper end 21 of the central body 11 by means of an upper ring 25 made of rigid plastic material, for example PP.

According to another variant, the material used to make the lid 20 has a bigger total thickness (e.g. 700μ or 800μ), keeping the percentage of EVOH equal to 1.5% of the total thickness, with the intent of optimizing the sealing effect against oxygen and non-deformation of the component without compromising its ease of detachment from the upper ring 25.

The upper ring 25 (FIGS. 2 and 8) is shaped so as to have a first circular shoulder 26, with a diameter bigger than that of the central body 11 and protruding to the outside of the latter, and a second internal circular shoulder 27, on the flat and upper surfaces of which the lid 20 is welded, which has an external profile mating with the internal profile of the upper ring 25. The latter also comprises stiffening ribs 30 disposed longitudinally and/or circumferentially and, in the solution of FIG. 2, an annular throat 31 in which a corresponding peripheral annular rib 32 of the lid 20 is suitable to be housed.

Figure 5:
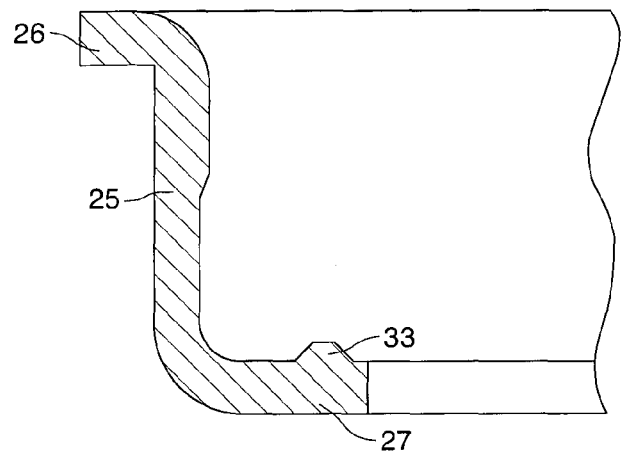
FIG. 5 is a detail of the first part in FIG. 2.

The upper ring 25 may also comprise, in one form of embodiment, an annular rib 33 (FIG. 5), which acts as an energy director in order to optimize the ultra-sound welding process of the lid 20 and the upper ring 25.

Furthermore, the second circular shoulder 27 of the upper ring 25 may be provided with holes 35 (FIG. 2) suitable to allow the inner super-pressure to be vented when the container is opened, thus avoiding the disadvantage of a possible spray of powder of the product (e.g. coffee) which otherwise might occur.

Figure 8:
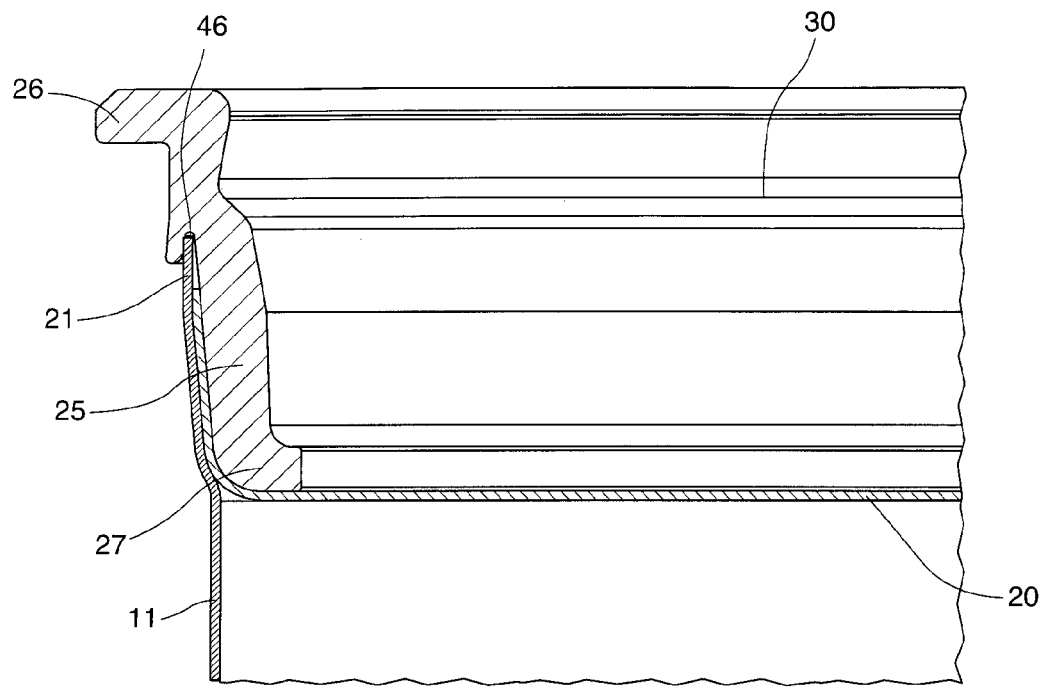
FIG. 8 is a variant of the first part in FIG. 2.
Figure 10:
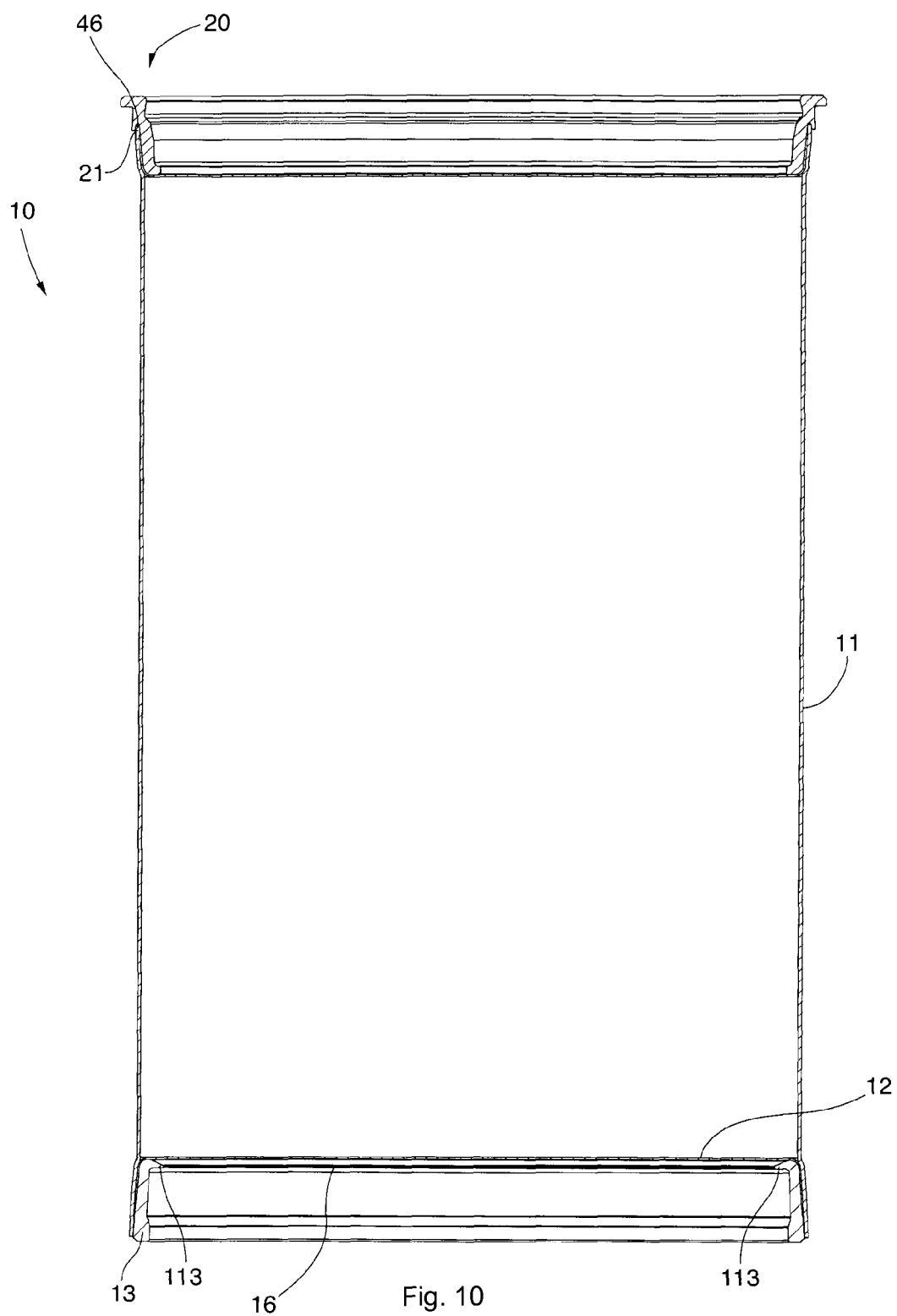
FIGS. 10 and 11 are respective cutaway and perspective views and in longitudinal section of a container according to a variant of FIG. 1.
Figure 11:
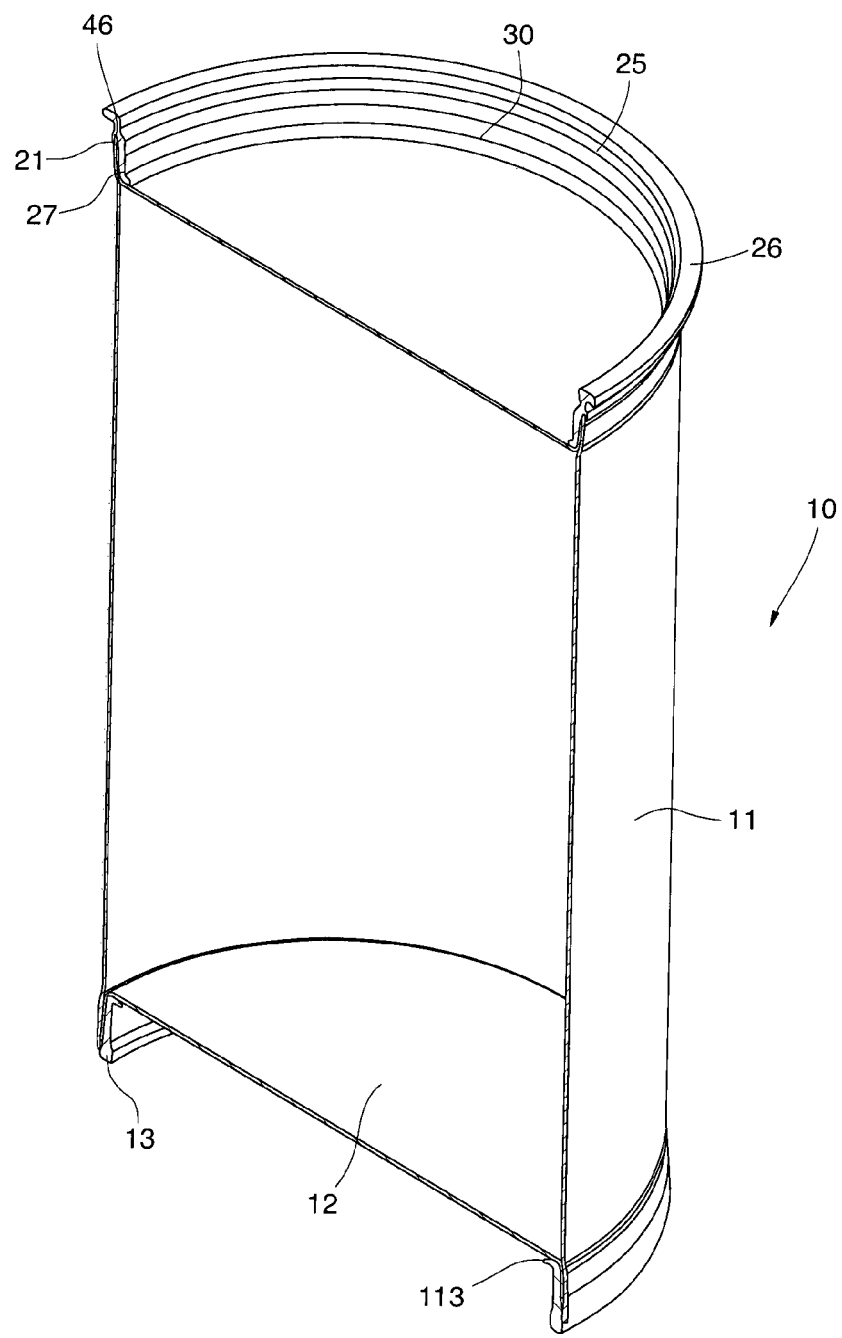

In the form of embodiment shown in detail in FIG. 8 and overall in FIGS. 10 and 11, the lid 20 is welded to the rigid upper ring 25 and inside the central body 11, in an intermediate position between the central body 11 and the upper ring 25.

This further improves the characteristics of sealing and rigidity of the container 10, since the lid 20 made of flexible material covers the upper ring 25 entirely and is disposed peripherally, sandwiched between the latter and the central body 11 to which it is attached, by welding, so that it is the lid 20 itself that functions as an oxygen barrier.

In the form of embodiment shown in FIG. 8, the upper ring 25 has peripherally an annular groove 46 facing downward in which, during the coupling step, the upper end 21 of the central body 11 can be inserted so as to create, between the upper ring 25 and the central body 11, another sealing effect which is completed by the upper edge of the lid 20. When the coupling weldings of the lid 20 and the upper ring 25 on the one hand, and the upper ring 25 and central body 11 on the other hand are completed, the sandwich effect thus obtained guarantees, also thanks to the extension of the upper end 21 of the central body 11 inside the annular groove 46 of the upper ring 25, an optimum sealing effect in the upper part of the container 10.

The particular shape of the lid 20 and the upper ring 25 prevents deformation and bulging toward the outside, possibly due to the internal super-pressure that is created when the foodstuff is inserted, as will be described in more detail hereafter, which instead occurs in known containers already at around 150-200 mbar.

According to another variant, the material used to make the upper ring 25 may provide the addition of a product that prevents the oxygen from passing (a so-called oxygen scavenger) inside the original mixture, so as to guarantee optimum freshness of the product inside the container 10 and to further optimize the characteristics of the latter.

Advantageously, unlike known containers, and in one form of embodiment, the lid 20 and the lower ring 13 (FIG. 6) are shaped so as to allow the containers 10 to be stacked, and consequently to optimize the disposition and use of the shelf space.

Figure 7:
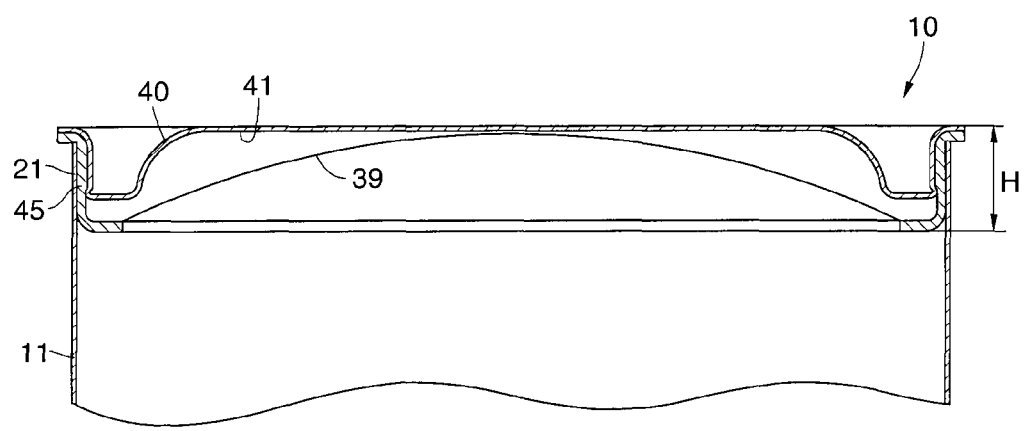
FIG. 7 is a partial view of a variant of the container in FIG. 1.

According to another variant of the present invention, shown in FIG. 7, the upper end 21 of the central body 11 is closed by a membrane 39, which functions as a lid, made of peelable multi-joined flexible material, consisting for example of the following 4 layers: PET 23µ; Alu 12µ; PET 12µ; cPPpeel 50µ, total thickness 0.109 mm, of the type known as "peel-off", which is welded on an upper ring 45 made of rigid plastic material, for example PP, with a possible oxygen scavenger, in turn welded onto the central body 11 and with functions similar to those of the upper ring 25 as described above.

A second lid 40 made of rigid plastic material, of the removable type, is positioned precisely inside the cylindrical wall of the upper ring 45. The lid 40 is shaped so as to comprise in its internal part a concave recess 41, in which the membrane 39 is suitable to be housed if this were to swell due to the super-pressure inside the container 10.

After it has first been opened by tearing off the membrane 39, the container 10 is closed simply by repositioning the lid 40, precisely and by slotting, in the upper ring 45.

The characteristic advantages of this variant described above are as follows:
  the upper ring 45 is designed with a specific height H which is greater than the maximum vertical deformation of the membrane 39 due to the super-pressure: the advantage deriving from this is that the lid 40 cannot be unseated, due to the presence of the concave recess 41;
  the membrane 39 and its opening tongue, not shown in the drawings, minimize the effort that the consumer must exert in order to open the container 10.

The material which the membrane 39 is made of guarantees a perfect seal against the pressures that characterize the container 10, thus preventing the known problems of the detachment of the membrane during the working life of the product.

In an alternative to the variant described above, which provides to use the membrane 39, the lid 40 is absent, if the container 10 is to function as a refill cartridge for another container or can, in turn provided with its own lid, for example closed by a screw.

Another configuration of the variant with the membrane 39 provides that, on the external perimeter, the upper ring 45 has an edge that protrudes externally with respect to the central body 11 and on which another lid can be positioned, slotted or in snap-in manner. This latter lid can be made of PE (or similar, given that the lid is easy to detach and reposition on the upper ring 45) with the function of another lid or over-cap for the central body 11.

One possibility of this configuration is to apply a venting valve on the membrane 39, in the part toward the inside of the central body 11, using a heat type welding for example.

According to another variant of the present invention, the presence of a venting valve is provided, not shown in the drawings, for example made of PP or equivalent material, joined with the material with the oxygen barrier obtained by means of the injection molding technique. The valve is for example positioned on the bottom 12 and inside the container 10, by means of heat or ultrasound welding.

Normally, the valve located on the bottom of a known container is the type that vents one-way toward the outside so that, by venting the pressure contained inside the container, the aromas inside also come out, so that it is consequently impossible to guarantee a residual internal pressure suitable to attach the aromatic components optimally inside the granules of powdered product (e.g. coffee).

On the contrary, using the specific valve as described above according to the present invention gives the container 10 the following improved characteristics:
  further improvement of the beneficial effects of the pressurization;
  preservation of a residual internal pressure that promotes the development and consequent attachment of the aromas;
  the implosion of the container 10 during transport at high altitudes is prevented, and the obvious consequent loss of the cylindrical shape and the aesthetic result, as happens in known containers.

Depending on the type of product used, for example coffee, and on the pressure range in which the valve works, there are the following possibilities:

the coffee is partly or totally de-gassed with super-pressure induced at the moment of packaging;

fresh coffee with minimum super-pressure induced at the moment of packaging, with a rigid valve which opens at about 250 mbar and closes at about 150 mbar to compensate the final internal pressure, the sum of the pressure set at the moment of packaging and the pressure generated by the coffee itself;

fresh coffee with minimum super-pressure induced at the moment of packaging, with a rigid valve which opens at a pressure comprised between about 400 mbar and about 700 mbar and closes at a pressure lower than or equal to about 300 mbar to compensate the final internal pressure, the sum of the pressure set at the moment of packaging and the pressure generated by the coffee itself.

If the bottom 12 is made of semi-rigid injected material, the valve could be co-molded with the bottom 12, positioning it on the internal side of the latter.

According to another variant of the present invention, the valve is applied directly on the lid 20, on its internal side, for example heat welded, or using other methods.

The method to produce the container 10 as described heretofore provides that the different components that make it up are preferably welded to each other as follows:

the longitudinal edges of the central body 11: induction welding;

the bottom 12 on the lower ring 13: heat welding, or induction welding;

the pre-assembled whole consisting of the bottom 12 and the lower ring 13 on the central body 11: induction welding;

the lid 20 on the upper ring 25 along the surfaces of the two shoulders 26 and 27: ultrasound welding;

the pre-assembled whole consisting of the lid 20 and the upper ring 25 on the central body 11: induction welding.

It should be noted that induction welding allows to optimize the airtight seal and therefore improves the barrier against the entrance of oxygen inside the container 10, compared with known containers.

According to another variant, not shown in the drawings but easily understood by the person of skill in the art, the invention provides to obtain the hermetic seal mechanically, instead of by welding, that is, using precision coupling of a known type, of the various components, for example of the lid and the upper ring.

In this case the lid of the central body 11 can peripherally comprise a ring with a tongue for opening, made of plastic material with no oxygen barrier, by means of injection molding, and centrally a disc made of a flexible film made of multi-joined oxygen barrier material, for example with 4 layers, heat welded to the ring described above. The lid thus made can be mechanically coupled with the upper ring, in this specific case made by means of injection molding and of oxygen barrier material, which in turn is heat welded to the central body 11. To increase the mechanical seal of the container 10, a circumferential band can be made to contain the combination of the upper ring and lid.

In this way the following advantages are obtained:

the critical situations of the different types of welding are eliminated;

the non-barrier zones, which can function as preferential channels for the entry of atmospheric oxygen inside the central body 11, are eliminated;

the circumferential band also functions as an anti-pilfering device and as a tamper-proof seal against possible tampering with the container and its content;

with one easy movement the container can be opened.

According to another characteristic feature of the present invention, inside the container 10 the foodstuff, for example coffee, is packaged using a packaging method based on pressurization. The method comprises a step of creating a vacuum and a subsequent step of introducing inert gas, such as for example nitrogen or carbon dioxide, so as to take the pressure inside the container 10 to levels slightly above atmospheric pressure (super-pressure), for example about 50 mbar.

In the variant that provides to use the membrane 39, the membrane 39 is attached to the upper ring 45 by heat welding while the pre-assembled whole consisting of membrane 39 and upper ring 45 is attached to the central body 11 by induction welding.

This is obtained by using a packaging machine of a known type, not shown in the drawings, which is disposed in an environment with a modified atmosphere. In particular the machine comprises a bell suitable to isolate the container 10, already full of coffee or other foodstuff, from the surrounding atmosphere. Inside the bell all the air is extracted from the container 10 and immediately afterward the air is replaced by the inert gas. The central body 11, already provided with the bottom 12, the lower ring 13 and the upper ring 25, is closed by the lid 20, always inside the bell, while the pressure of the inert gas is slightly higher than atmospheric pressure (super-pressure). At this point, the container 10, closed and sealed, is removed from the bell.

It should be noted that at least the following two characteristics are new and original:

the creation of the vacuum and the subsequent introduction of inert gas are carried out in a container 10 that is flexible but still maintains its cylindrical shape;

the induction welding system of the pre-assembled whole of lid 20-upper ring 25 on the central body 11 occurs totally inside the bell, and is totally different from the state of the art, which provides the pressurization method usually applied to rigid and welded packages in which it is possible to perform a double seaming operation on the components suitable for closing/sealing the container.

Thanks to this packaging method, the following advantageous effects are obtained:

the foodstuff (e.g. coffee) is aged inside the container 10, resulting in an improved quality of the product (body and aroma) even after a few weeks;

the super-pressure allows a slower oxidation, guaranteeing that when the container 10 is opened, a fresher product is obtained compared with those packaged with other known techniques.

To optimize the pressurization step and prevent the phenomenon of spraying of the product (e.g. coffee) when the container 10 is opened, it is another characteristic of the present invention to have a precise volume of head space, toward the lid 20. To obtain this, it is necessary to apply an automatic vibration of the container 10 during the filling step.

Furthermore, the specific use of the lower ring 13 guarantees a greater seal and stability of the container 10 stressed by the internal super-pressure.

A variant that comes within the field of the present invention provides that the coffee is packaged in a protective atmosphere using the method of washing in inert gas, which consists in totally extracting the oxygen present in the container 10 by blowing an inert gas inside it, such as for example nitrogen, which replaces the oxygen molecules themselves (the so-called total compensation method).

This is obtained by using a packaging machine in modified atmosphere, not shown in the drawings, designed and constructed specifically with an inlet tunnel already sectioned off from the atmosphere and nitrogen-saturated, through which an empty container 10 is subjected to a preliminary wash with partial removal of the oxygen and arrives at the filling-closing area. This area is connected to the inlet tunnel and immersed, with no break in continuity, in a nitrogen atmosphere so that the filling of the container 10 with the product (e.g. coffee) and the subsequent closure thereof by welding the lid 20 occur in absence of oxygen (final wash). In this way, inside the container 10 a percentage of residual oxygen is obtained that is less than 1.5%, guaranteeing the freshness of the packaged product and integral for its whole life cycle.

The peculiarity of this variant is that the product is washed with inert gas inside the container 10 which, although it has at least the lateral wall flexible, must maintain its cylindrical shape and contains inside it a loose product (powder or grains), unlike in the state of the art where the product washed consists of paper pods or plastic capsules containing a minimum dose of ground coffee.

The container 10 as described heretofore guarantees a shelf life of its content, in its entirety and integrity, of more than 12 months, and residual oxygen during this period of less than 1.5%.

It is clear that modifications and/or additions of parts or steps may be made to the container 10, the method to produce it and the packaging method as described heretofore, without departing from the field and scope of the present invention.

It is also clear that, although the present invention has been described with reference to some specific examples, a person of skill in the art shall certainly be able to achieve many other equivalent forms of containers for foodstuffs, or other methods to produce them, or other packaging methods, having the characteristics as set forth in the claims and hence all coming within the field of protection defined thereby.

The invention claimed is:

1. Container for foodstuffs comprising a central body made of flexible material, a bottom welded to a lower end of said central body, and a lid welded to an upper end of said central body by means of an upper ring, made of rigid plastic material, wherein the container also comprises a lower ring, also made of rigid plastic material, which makes said bottom solid with said central body, wherein the bottom and/or the lid are welded peripherally, respectively, to the lower ring and to the upper ring and inside the central body, in an intermediate position between the central body and, respectively, lower ring or upper ring.

2. Container as in claim 1, wherein said bottom comprises a film made of multi-joined material, pre-shaped and welded on said lower ring.

3. Container as in claim 1, wherein said bottom is attached to said lower ring and to said central body so as to completely cover the lower ring and thus act as a barrier against oxygen.

4. Container as in claim 1, wherein said lower ring is provided with a plurality of stiffening ribs disposed longitudinally or circumferentially.

5. Container as in claim 1, wherein said lower ring has internal edges, onto which said bottom is attached, at least partly bent downward.

6. Container as in claim 1, wherein said upper ring is shaped so as to have a first circular shoulder, with a diameter bigger than that of said central body and protruding to the outside of the latter, and a second internal circular shoulder, the first and second circular shoulders having flat and upper surfaces on which said lid is welded, the latter having an external profile mating with the internal profile of said upper ring.

7. Container as in claim 1, wherein peripherally said upper ring has an annular groove facing downward for the insertion of an upper end of the central body, during the coupling step.

8. Container as in claim 1, wherein said upper ring also comprises an annular rib which acts as an energy director in order to optimize an ultrasound welding process between said lid and said upper ring.

9. Container as in claim 1, wherein said lid and the lower ring are shaped so as to allow several containers to be stacked (stackability).

10. Container as in claim 1, wherein said lid comprises a membrane made of multi-joined flexible and peelable material, welded to said upper ring which in turn is welded to said central body.

11. Method for packing a foodstuff inside a container as in claim 1, wherein the method comprises a step of creating a vacuum inside said container, after having filled the container with said foodstuff, a subsequent step of introducing an inert gas, so as to bring the inside of said container to a super-pressurized level which is slightly higher than atmospheric pressure, and a subsequent step of closing said container in order to maintain said super-pressure inside the container.

12. Method to produce a container for foodstuffs comprising a first step in which a central body is made of multi-joined flexible material, a second step in which a bottom is made of multi-joined flexible material to be welded to a lower end of said central body, and a third step in which a lid is made, to be welded to an upper end of said central body by means of an upper ring made of rigid plastic material, wherein in the course of a subsequent fourth step said bottom is welded to a lower ring made of rigid material, wherein during said welding step of the bottom, lower ring and central body, and respectively the lid, upper ring and central body, the bottom and/or the lid are welded respectively, to the lower ring and to the upper ring and inside the central body, in an intermediate position between the central body and, respectively, lower ring or upper ring.

13. Method as in claim 12, wherein during said first step the longitudinal edges of said central body are attached by means of induction welding, in that during said fourth step said bottom is attached on said lower ring by means of welding, either heat welding or induction welding, in that in the course of a fifth step the pre-assembled whole consisting of said bottom and of said lower ring is attached to said central body by means of induction welding, in that in the course of a sixth step said lid is attached on said upper ring by means of ultrasound welding, and in that in the course of a seventh step the pre-assembled whole consisting of said lid and of said upper ring is attached on said central body by means of induction welding.

* * * * *